US009702417B2

United States Patent
Dix et al.

(10) Patent No.: US 9,702,417 B2
(45) Date of Patent: Jul. 11, 2017

(54) METHOD OF CALIBRATION OF A HYDRAULICALLY OPERATED CLUTCH OF A CONTINUOUSLY VARIABLE TRANSMISSION USING PRESSURE BETWEEN A HYDROSTATIC PUMP AND MOTOR

(75) Inventors: Peter J. Dix, Naperville, IL (US);
Garth H. Bulgrien, Ephrata, PA (US);
Robert C Prasse, Chicago, IL (US);
Pavel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 203 days.

(21) Appl. No.: 14/240,703

(22) PCT Filed: Aug. 27, 2012

(86) PCT No.: PCT/US2012/052573
§ 371 (c)(1),
(2), (4) Date: Feb. 24, 2014

(87) PCT Pub. No.: WO2013/029058
PCT Pub. Date: Feb. 28, 2013

(65) Prior Publication Data
US 2014/0207350 A1    Jul. 24, 2014

Related U.S. Application Data

(60) Provisional application No. 61/527,523, filed on Aug. 25, 2011.

(51) Int. Cl.
*F16D 48/02* (2006.01)
*F16D 48/06* (2006.01)

(52) U.S. Cl.
CPC ............. *F16D 25/14* (2013.01); *F16D 48/02* (2013.01); *F16D 48/066* (2013.01);
(Continued)

(58) Field of Classification Search
CPC .. B60T 1/005; F16H 63/3416–63/3491; F16H 39/00–39/42; F16H 47/04;
(Continued)

(56) References Cited

U.S. PATENT DOCUMENTS

| 2,097,436 A | 11/1937 | Bennetch |
| 3,810,531 A | 5/1974 | Edmunds |

(Continued)

FOREIGN PATENT DOCUMENTS

| CN | 102062206 | 5/2011 |
| DE | 19739215 | 3/1998 |

(Continued)

OTHER PUBLICATIONS

Supplementary European Search Report in EP Application No. 12 82 5630.2, Nov. 25, 2016, 8 pages.
(Continued)

*Primary Examiner* — Terry Chau
(74) *Attorney, Agent, or Firm* — Rickard K. DeMille; Rebecca L. Henkel

(57) ABSTRACT

A method of calibrating a hydraulically operated clutch in a continuously variable transmission of a vehicle, includes steps of filling the clutch as if for a shift, using a control signal value for achieving a test pressure, and determining a resulting change in a pressure condition in a hydrostatic power unit of the transmission. If the change indicates initial engagement, then a value representative of the signal value used is recorded. If greater than initial engagement is indicated, or the vehicle moved, then the clutch is emptied and tested using a lower test pressure. If initial engagement is not indicated, the clutch is emptied and refilled to a greater test pressure. An exemplary pressure condition is a difference in pressure in lines between a pump and motor of the
(Continued)

power unit. During the calibration, the vehicle can be held stationary with a parking brake or the like.

17 Claims, 7 Drawing Sheets

(52) U.S. Cl.
CPC ............... *F16D 2048/0269* (2013.01); *F16D 2500/1026* (2013.01); *F16D 2500/1088* (2013.01); *F16D 2500/10412* (2013.01); *F16D 2500/111* (2013.01); *F16D 2500/3024* (2013.01); *F16D 2500/30426* (2013.01); *F16D 2500/3101* (2013.01); *F16D 2500/5014* (2013.01); *F16D 2500/5018* (2013.01); *F16D 2500/50254* (2013.01); *F16D 2500/70418* (2013.01)

(58) Field of Classification Search
CPC .......... F16H 2047/045; F16H 61/40–61/4026; F16H 2059/6838; F16H 2059/6846; F16H 2059/6861; B60W 10/103; B60W 10/02; B60W 2710/022; B60W 10/182; F16D 25/14; F16D 48/02; F16D 48/062; F16D 48/066; F16D 2048/0269; F16D 2500/5014; F16D 2500/5018; F16D 2500/50245; F16D 2500/50251; F16D 2500/50263; F16D 2500/50254; F16D 2500/50275; F16D 2500/50281; F16D 2500/1026; F16D 2500/10412; F16D 2500/1088; F16D 2500/111; F16D 2500/3024; F16D 2500/30426; F16D 2500/3101; F16D 2500/7041
See application file for complete search history.

(56) References Cited

U.S. PATENT DOCUMENTS

| | | | |
|---|---|---|---|
| 4,055,047 A | 10/1977 | Hara | |
| 4,102,222 A | 7/1978 | Miller et al. | |
| 4,167,855 A | 9/1979 | Knapp | |
| 4,310,078 A | 1/1982 | Shore | |
| 4,489,552 A | 12/1984 | Watanabe et al. | |
| 4,530,416 A | 7/1985 | Kassai | |
| 4,543,786 A | 10/1985 | Shuler | |
| 4,653,350 A | 3/1987 | Downs et al. | |
| 4,759,185 A | 7/1988 | McConnell et al. | |
| 4,811,225 A | 3/1989 | Petzold et al. | |
| 5,184,466 A | 2/1993 | Schniederjan et al. | |
| 5,224,577 A * | 7/1993 | Falck | F16H 61/061 192/109 F |
| 5,337,871 A * | 8/1994 | Testerman | F16D 25/123 192/85.61 |
| 5,406,793 A | 4/1995 | Maruyama et al. | |
| 5,449,329 A | 9/1995 | Brandon et al. | |
| 5,467,854 A | 11/1995 | Creger et al. | |
| 5,468,198 A | 11/1995 | Holbrook et al. | |
| 5,531,304 A | 7/1996 | Ishino et al. | |
| 5,540,051 A | 7/1996 | Maruyama et al. | |
| 5,573,473 A | 11/1996 | Asayama et al. | |
| 5,580,332 A | 12/1996 | Mitchell et al. | |
| 5,671,137 A | 9/1997 | Ishino et al. | |
| 5,684,694 A | 11/1997 | Ishino et al. | |
| 5,737,979 A * | 4/1998 | McKenzie | F16H 61/061 74/731.1 |
| 5,853,076 A | 12/1998 | McKee et al. | |
| 5,980,411 A | 11/1999 | Wontner | |
| 6,080,074 A | 6/2000 | Ulbrich et al. | |
| 6,088,645 A | 7/2000 | Kawasaki et al. | |
| 6,115,661 A | 9/2000 | Hosseini et al. | |
| 6,250,077 B1 | 6/2001 | Iino et al. | |
| 6,285,942 B1 | 9/2001 | Steinmetz et al. | |
| 6,292,732 B1 | 9/2001 | Steinmetz et al. | |
| 6,295,497 B1 | 9/2001 | Kuras | |
| 6,332,860 B1 | 12/2001 | Hubbard et al. | |
| 6,442,934 B1 | 9/2002 | Okuda et al. | |
| 6,481,314 B2 | 11/2002 | Nemoto et al. | |
| 6,524,205 B1 | 2/2003 | Irikura et al. | |
| 6,616,559 B1 | 9/2003 | Hori et al. | |
| 6,672,990 B2 | 1/2004 | Netzer | |
| 6,832,978 B2 | 12/2004 | Buchanan et al. | |
| 7,037,236 B2 | 5/2006 | Ishibashi et al. | |
| 7,063,638 B2 | 6/2006 | Weeramantry | |
| 7,082,757 B2 | 8/2006 | Teslak et al. | |
| 7,147,239 B2 | 12/2006 | Teslak et al. | |
| 7,278,953 B2 | 10/2007 | Meyer et al. | |
| 7,549,287 B2 | 6/2009 | Foster et al. | |
| 9,115,772 B2 * | 8/2015 | Dix | F16D 48/06 |
| 2003/0097874 A1 | 5/2003 | Milender et al. | |
| 2005/0032605 A1 | 2/2005 | Booth et al. | |
| 2008/0139363 A1 | 6/2008 | Williams | |
| 2008/0194384 A1 * | 8/2008 | League | F16H 61/061 477/130 |
| 2008/0242464 A1 | 10/2008 | Kumazaki et al. | |
| 2010/0312443 A1 * | 12/2010 | Long | F16H 61/061 701/67 |
| 2014/0200114 A1 * | 7/2014 | Dix | B60T 1/062 477/92 |

FOREIGN PATENT DOCUMENTS

| | | |
|---|---|---|
| EP | 1150031 | 10/2001 |
| EP | 2053262 | 4/2009 |
| EP | 2105626 | 9/2009 |

OTHER PUBLICATIONS

European Search Report in EP Application No. 12 82 5630, Aug. 11, 2016, 5 pages.

\* cited by examiner

METHOD OF CALIBRATION OF A HYDRAULICALLY OPERATED CLUTCH OF A CONTINUOUSLY VARIABLE TRANSMISSION USING PRESSURE BETWEEN A HYDROSTATIC PUMP AND MOTOR

This application claims the benefit of U.S. Provisional Application No. 61/527,523, filed Aug. 25, 2011.

TECHNICAL FIELD

This invention relates generally to calibration of a hydraulically actuated clutch of a CVT, and more particularly to calibration by monitoring pressure changes between a hydrostatic pump and motor of the transmission to determine initial engagement of the clutch.

BACKGROUND ART

The disclosure of U.S. Provisional Application No. 61/527,523, filed Aug. 25, 2011, is hereby incorporated herein in its entirety by reference.

Transmissions with hydraulically operated clutches need to consistently operate such that the timing of clutch engagement can be controlled precisely.

This can be difficult, since the clutches control multiple plates, and there is variation between springs and other component tolerances, such that the pressure needed to move the piston out to the point at which the plates touch and the clutch starts to transmit torque can vary quite a bit.

Most transmissions up to now in tractors have been power shift. Continuously variable transmissions or CVTs are becoming more popular and have significantly different architectures, often using a hydrostatic pump and motor. The pressure between the pump and motor is a direct indication of the torque through the hydrostatic unit, and in turn an indication of the torque through the clutch. In some designs, the hydraulic pump and motor can be in separate housings, connected with tubes or hoses, but they may be in the same housing (a hydrostatic unit or HSU), which typically increases efficiency.

Typically, known electronically controlled transmissions with such clutches use a calibration routine. Clutches are engaged to create driveline torque to work against the parking brake. A searching method is used to determine the currents needed to provide the pressure to just start to engage the clutch. This point is usually determined by when the engine speed reduces or engine torque increases, indicating that the clutch is transmitting torque. However, a shortcoming with this approach is that engine speed can vary as a result of other reasons, such as when other loads on the engine change, such as hydraulic or PTO loads, and various drags on the engine vary and such. Also, tractor engines have a governor that is quite complex, and may change engine speeds due to complex algorithms to manage emissions, efficiency and other factors. As a result, how much the engine speed dips cannot always be a direct indication of the level of torque on a clutch, which can result in different calibration values. Clutch calibration done using engine torque has similar shortcomings. A torque sensor in connection with a clutch has also been used for calibration, but such torque sensors are expensive and add complexity. Optionally, adding another torque sensor might be one costly option. Also, engine torque could be estimated from fuel, but this would be a slower signal, and again subject to other loads on the engine.

Thus, what is sought is a manner of hydraulic clutch calibration that does not rely on engine speed, torque or separate torque sensors, and overcomes one or more of the shortcomings set forth above.

SUMMARY OF THE INVENTION

What is disclosed is a manner of hydraulic clutch calibration that does not rely on engine speed or engine torque, and overcomes one or more of the shortcomings set forth above.

According to a preferred aspect of the invention, the clutch under calibration is held filled in a manner similar to how the clutch is used during a shift. The pressure in the clutch is commanded using a control signal command, e.g., in the form of an electrical current value, translated to a pressure in a pressure reducing valve. This valve is then connected to a rotating clutch which is pressure applied, spring released. It is held at this test current value, and a determination made as to whether the clutch current is too high or too low. This determination is made by checking the pressure in the hydraulic connection between the pump and the motor, or within the HSU. The test is repeated with different control signal values, e.g., test currents, either high or lower, depending on the result. Typically the algorithm starts with a default control signal value, and it is low, so as to not aggressively engage the clutch by accident. Once the pressure is sensed, the clutch is commanded to empty, so the engine does not lug down too much. This is also done to reduce the chance of driving through the parking brake. A separate check is done on the output speed, so the calibration is stopped if the vehicle moves. A baseline pressure is recorded before calibration or before each time the clutch is engaged, since the pressure in the HSU will not be zero when the clutch is not engaged, due to drag, but also the charge pressure in the HSU that keeps the HSU cool.

According to another preferred aspect of the invention, clutch engagement is detected using the difference of the pressure transducers in the HSU as an indication of driveline torque. Rather than actually calculate the clutch pressure or driveline torque, the clutch calibration looks at the HSU pressure signals directly, since at the ideal kiss point, both the driveline torque and clutch torque should be zero. It is expected that there will be noise on the pressure transducers, or other issues with pressure fluctuations. So that this is not a problem or does not result in a false detection, the calibration preferably looks for a change in the difference between the pressures, rather than a set level of the difference.

Use of HSU pressure for clutch calibration is advantageous as it does not depend on other factors, and it is a more direct measure of torque. As noted above, engine speed can vary as other loads on the engine change, such as hydraulic or PTO loads, various drags on the engine that may vary and such. Also, the engine governor is quite complex, and may change engine speeds due to complex algorithms to manage emissions, efficiency and other factors. How much the engine dips cannot always be a direct indication of the level of torque, which can result in different calibration values Additional sensors may be needed on the HSU (typically two are needed, since the direction of torque through the HSU may change depending on the range), but these are typically present for other reasons. If a separate torque sensor already exists on a vehicle, it may be advantageous to use it, especially if it is used on a powershift (non-CVT version of a transmission).

As alternative embodiments of the invention, the method works with various CVT architectures, any time such clutches are used and the HSU indicates the torque through them. As another alternative, rather than using separate pressure sensors or transducers in the fluid lines, a single differential pressure transducer configured to determine a pressure differential between two ports could be used.

DETAILED DESCRIPTION OF THE INVENTION

Figure 6:
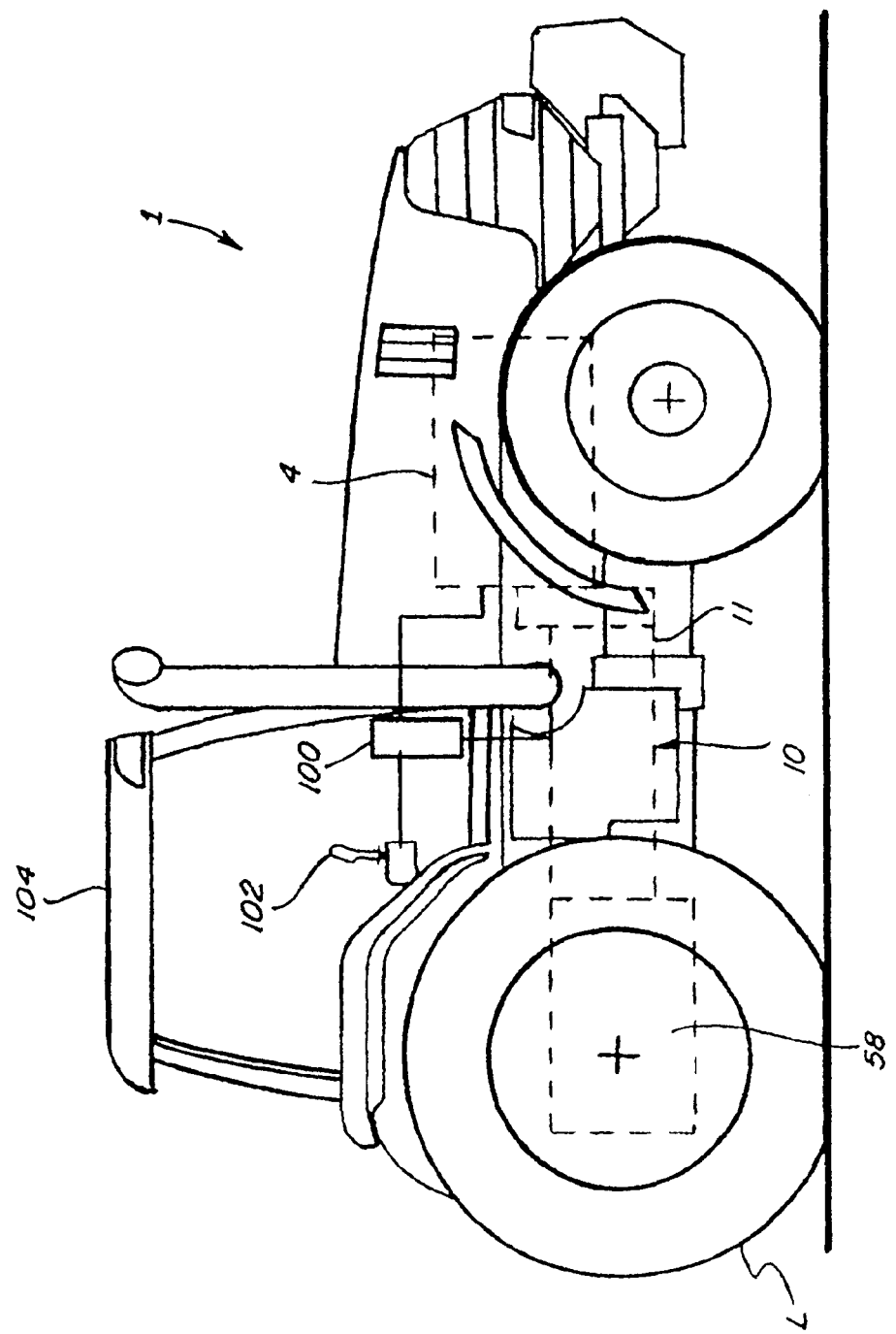
FIG. 6 is a simplified side view of a vehicle for use with the method of the invention.

Referring now to the drawings, apparatus for use with the method of the invention and illustrations of aspects of the invention are shown. In FIG. 6 a representative vehicle which is a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, a representative embodiment 10 of which is shown schematically in FIG. 1.

Figure 1:
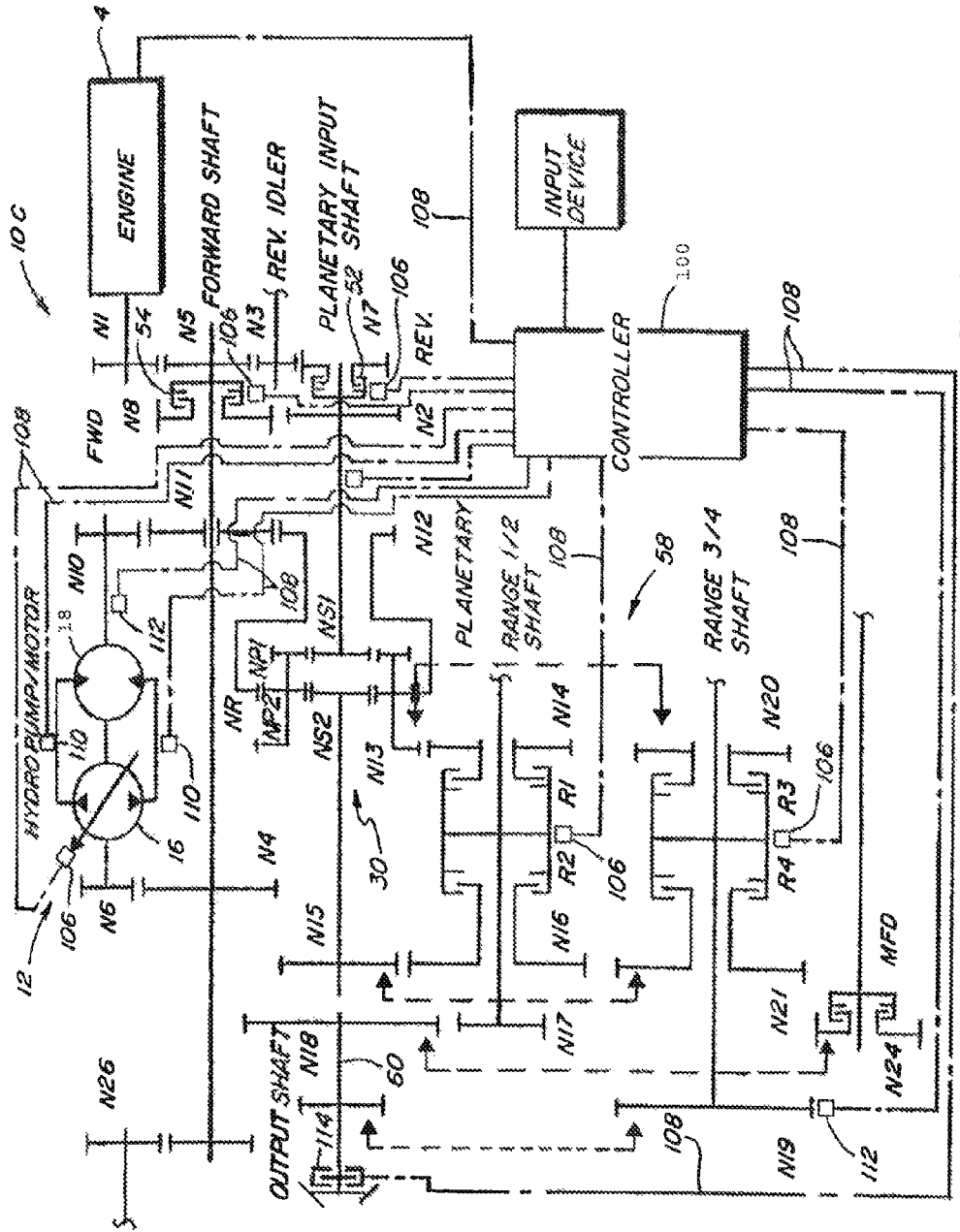
FIG. 1 is a simplified schematic representation of a CVT for use with the method of the invention.

Referring to FIG. 1, transmission 10 is contained in a transmission housing 11 and includes a hydrostatic power unit 12, also referred to as an HSU, and a planetary power unit 30 which are coupled to a driveline including a range gear set 58 mounted within transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Hydrostatic power unit 12 of transmission 10 includes a fluid pump 16 coupled by fluid conduits 17 in a closed loop to a fluid motor 18. Motor 18 is coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Machine 1 includes a processor based controller 100 in connection with an input device 102 located preferably in operator cab 104 of machine 1, via a suitable communications path 108, to adjust the angle of a swash plate of pump 16, denoted by the term "SPA", for controlling operation of the transmission. As an exemplary embodiment, pump 16 can be an electronically controlled variable displacement hydraulic pump of well known construction.

Planetary power unit 30 includes a primary sun gear NS1 on a planetary input shaft 32 connectable with power source 4 via a forward directional clutch 54 or a reverse directional clutch 52. Power unit 30 is selectively coupled to the load L, coupled to the hydrostatic power unit 12 and selectively coupled to the power source 4, under automatic control of controller 100. For connection to the load L, the hydro-mechanical transmission 10 includes an output shaft 60 coupled to the load L which carries an input gear N18 engaged with an output gear N17 on a range 1/2 shaft of range gear set 58, and a gear N22 engaged with a gear N19 on a range 3/4 shaft. The range 1/2 shaft can be coupled to planetary power unit 30 via automatic operation of range selectors or clutches R1 and R2 for power flow through gears N13 and N14, or N15 and N16, respectively. The range 3/4 shaft can be coupled to unit 30 via range selectors or clutches R3 and R4 for power flow via gears N13 and N20, or N15 and N21. Range 1/2 shaft and range 3/4 shaft can also be simultaneously coupled to power unit 30, to provide dual power flow.

The control of the various clutches will be automatically controlled by controller 100, using actuators 106 connected to controller 100 via suitable conductive paths 108. Transmission 10 also includes appropriate sensors, including pressure sensors 110 for sensing pressure conditions in conduits 17 connecting pump 16 and motor 18, and speed sensors 112 for sensing speeds of load shaft 60, all connected to controller 100 via conductive paths 108. Controller 100 is also connected to engine 4 for receiving speed and other information therefrom.

In operation, the continuously variable hydromechanical transmission 10 can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate transmission 10 for a pure hydrostatic power flow by disengaging both clutches 52 and 54, and engaging two range clutches. Typically, the R1 and R2 range clutches, and the R1 and R4 clutches.

As a result, with transmission 10, there is no selection for a work range or road range per se. However, the transmission provides a seamless transition between ranges to provide work/road configurations as desired. Speed change from zero to maximum speed is achieved in a smooth and continuous manner by changing the SPA of the pump 16 under control of controller 100. For each speed range, substantially the full range of travel of the swash plate is used. That is, the swash plate will be at one end of the range its travel for minimum speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position. And, the direction of power flow through the hydrostatic power unit will often reverse during these range changes.

Transmission 10 includes a parking brake 114 in connection with load shaft 60, which is utilized according to the invention for enabling shuttle shifts and other operations. Parking brake 114 is connected to controller 100 via a suitable conductive path 108 for automatic operative control thereby, including to proportionally or gradually engage, and release or disengage, under certain conditions. To achieve this latter capability, as a non-limiting example, parking brake 114 can be controlled using a proportional pressure reducing valve operated by an electrical signal from controller 100. For operation when machine 1 is not operating, parking brake 114 can be engaged by a spring or other biasing element or elements, or by mechanical means.

Note the two paths through the transmission, one through the hydrostatic unit and one through the directional clutches. The planetary unit is driven by both paths, effectively allowing the hydrostatic unit to vary the ground speed in a continuous range. In ranges 1 and 3, increasing the swash plate angle results in a higher TRR. In ranges, 2 and 4, this is reversed, and decreasing the swash plate angle results in higher TRR.

Clutch Engagement

Figure 2:
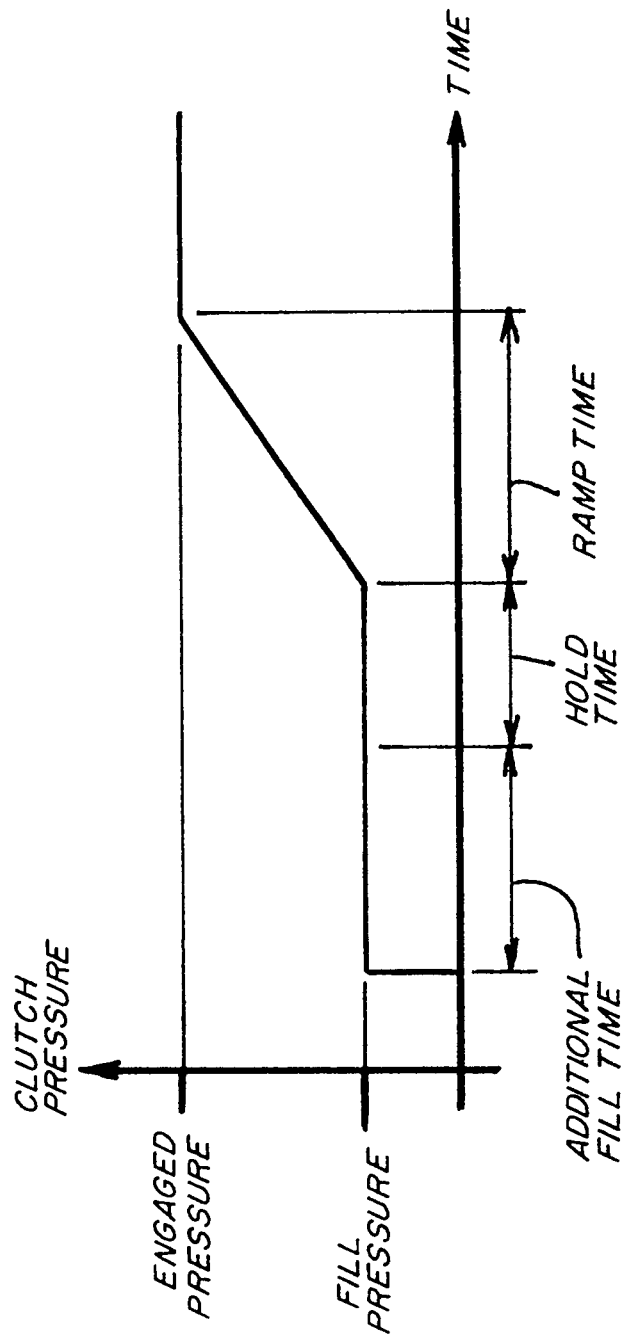
FIG. 2 is a diagrammatic representation of clutch pressure versus time for a clutch engagement.

An example of a clutch engagement is illustrated in FIG. 2. This is used for both the range clutches R1-R4 and direction clutches 52 and 54. Different parameters may be used in different situations. In all cases the pressure is limited to the regulated system pressure, it cannot be higher. The first phase is the "Additional Filling" stage, where the clutch is filled, but the pressure is held just at the point at which the clutch starts to engage. It is termed "additional" since the clutch is always quick filled prior to this state. The decision to quick fill is done by logic downstream. The next phase is the "Ramping" stage, where the pressure in the clutch is ramped up so that the engagement can be done in a controlled way. The ramp is started at the "Fill Pressure" (which is calibrated and may change at run time) and ended at the "Engaged Pressure". The total time of the ramp is "Ramp Time".

There is an optional last stage, called "Engaged" where the pressure is maintained at the Engaged Pressure. Although this could be viewed as not part of the clutch modulation, it is included as a state to represent times when this particular clutch may be engaged, but another clutch may not have finished the shift. The shift will generally be considered over when the pressure modulation is done in both the engaging the on-coming and disengaging the off-going clutches.

Clutch Disengagement

Figure 3:
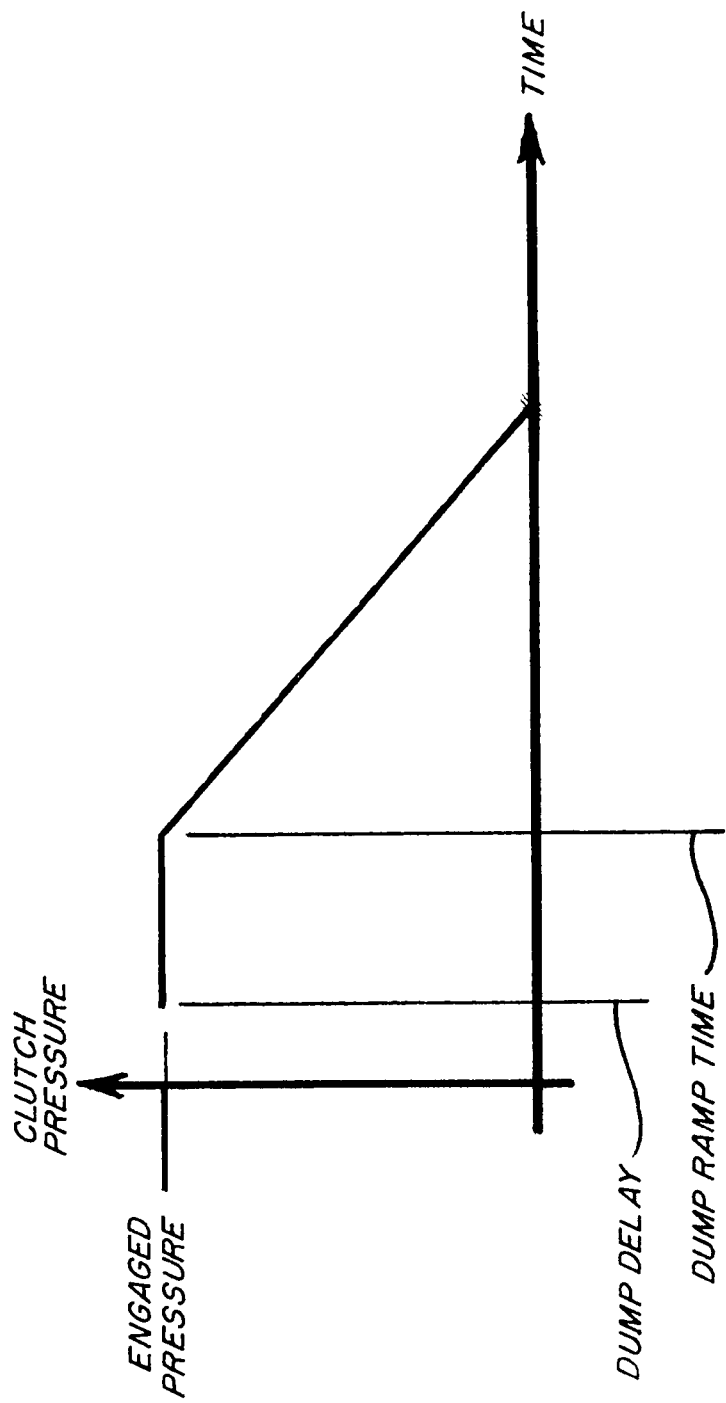
FIG. 3 is another diagrammatic representation of clutch pressure versus time, for clutch disengagement.
Figure 4:
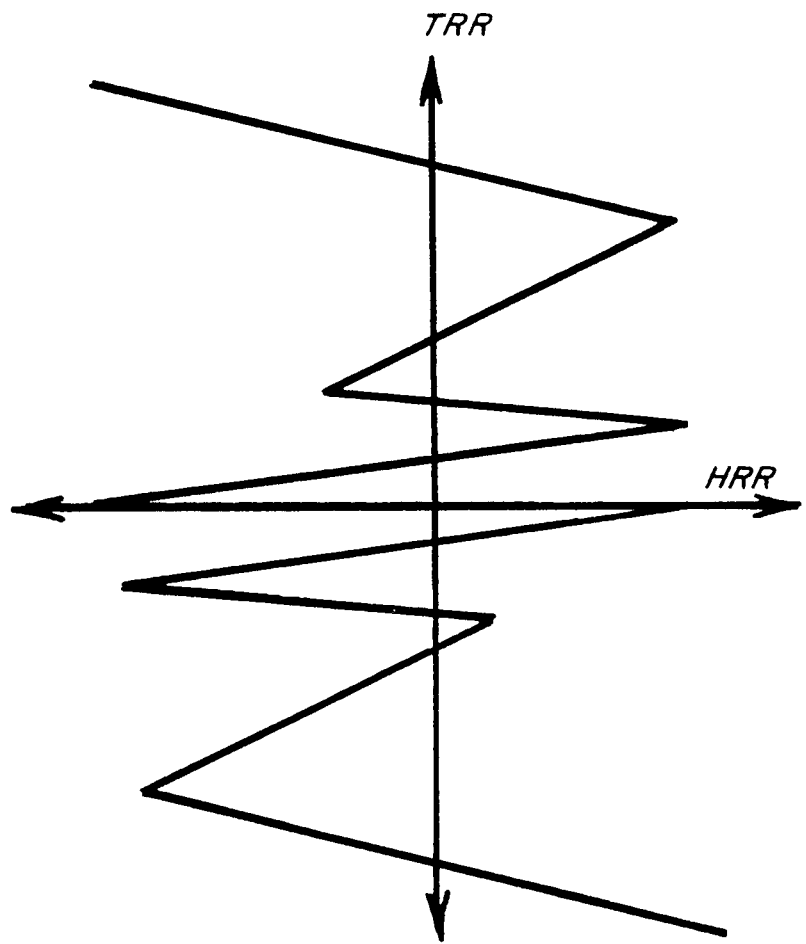
FIG. 4 is a diagrammatic representation of hydrostatic reciprocal ratio versus transmission ratio for shifts of the transmission of FIG. 1.

An example of clutch disengagement (dumping) is shown in FIG. 3. This is used for both the range and direction clutches. Different parameters may be used in different situations. Dumping a clutch due to operator commands from the clutch pedal may be done in a different manner.

The first phase of the dumping is simply a delay in dumping. This is often needed, since a clutch will be filling at the same time, and the ramping needs to be delayed so engaging and disengaging clutches can be timed such that the shift is smooth.

The second phase is the dump ramp. The ramp is controlled by a look up table, so that any shape may be used. The ramp is started at the "Engaged Pressure" and ended at the zero pressure. The total time of the ramp is "Dump Ramp Time".

At the end of the second phase, the clutch still may be partially engaged, due to errors in the pressure control and tolerance. After the pressure is ramped to zero, a full negative pressure is commanded to fully empty the clutch. Zero actual pressure is also maintained the whole while the clutch is disengaged, to avoid any chance of even slight engagement or drag. This is represented by a full negative pressure, since zero pressure is defined as the kiss pressure.

Figure 5:
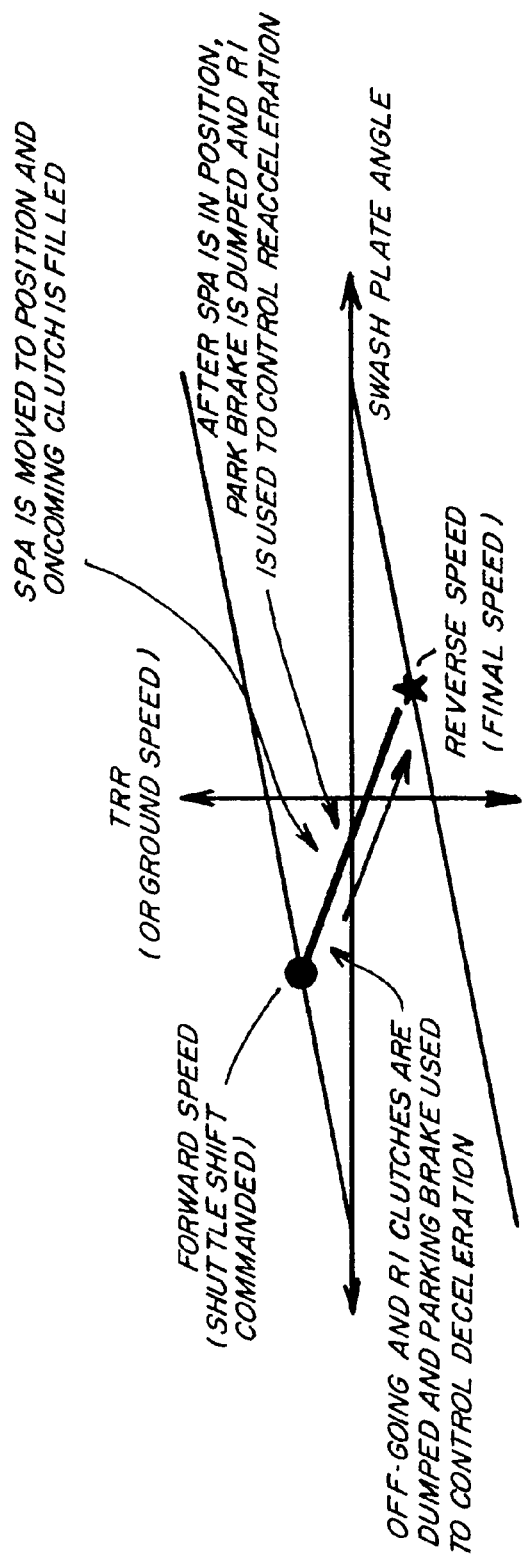
FIG. 5 is a diagrammatic representation of transmission ratio versus swash plate angle for a representative shift of the transmission.

FIG. 5 is a diagrammatic representation of transmission ratio versus swash plate angle for a representative shuttle shift of the transmission, illustrating points at which precise clutch operation is required.

Conversion from Pressure to Current

The pressures up to this point have been in terms of the "kiss point" of the clutch, such that zero pressure represents the pressure needed to overcome the spring force and for the plates to begin to make contact. Pressure higher than zero will engage the clutch.

The print for valve includes a graph of the pressure vs. control signal value (current in amps) for a typical transmission. From this graph, the points in Table 1 were estimated (this is example data and may not be the exact values used). Note that the nominal electrical current value of a control signal required to command any pressure is subtracted off (this is a value of 0.130 A).

TABLE 1

| Pressure Reducing Valve Pressure vs. Current | |
|---|---|
| Pressure (bar) | Current (A) |
| 0 | 0 |
| 2.1 | 0.07 |
| 6 | 0.17 |
| 13.3 | 0.32 |
| 18 | 0.405 |
| 22 | 0.47 |
| 23 | 0.52 |
| 24 | 0.75 − 0.13 = 0.62 |

Application of Calibration Data

The calibration data is represented as an offset on the clutch current. This offset is the current required to produce the pressure in the clutch that just overcomes the clutch springs and plates just begin to touch.

Note that the calibration will account for variations such as

1. Clutch spring constant.
2. Clutch spring preload.
3. Clutch piston travel required for kiss point, including clutch plate and separator plate thicknesses, piston dimensions, clutch can dimensions and more.
4. Variations in the pressure reducing valve current to pressure relationship.
5. Inaccuracies in ECU measuring and controlling current.

The calibration algorithm will result in a current offset that accounts for this variation. The offset will be used until the calibration is performed again.

Terms

CVT—Continuously Variable Transmission

HSU—Hydrostatic Unit

SPA—Swash plate Angle

TRR—Transmission Reciprocal Ratio (Transmission Output Shaft Speed/Engine Speed)

Figure 7:
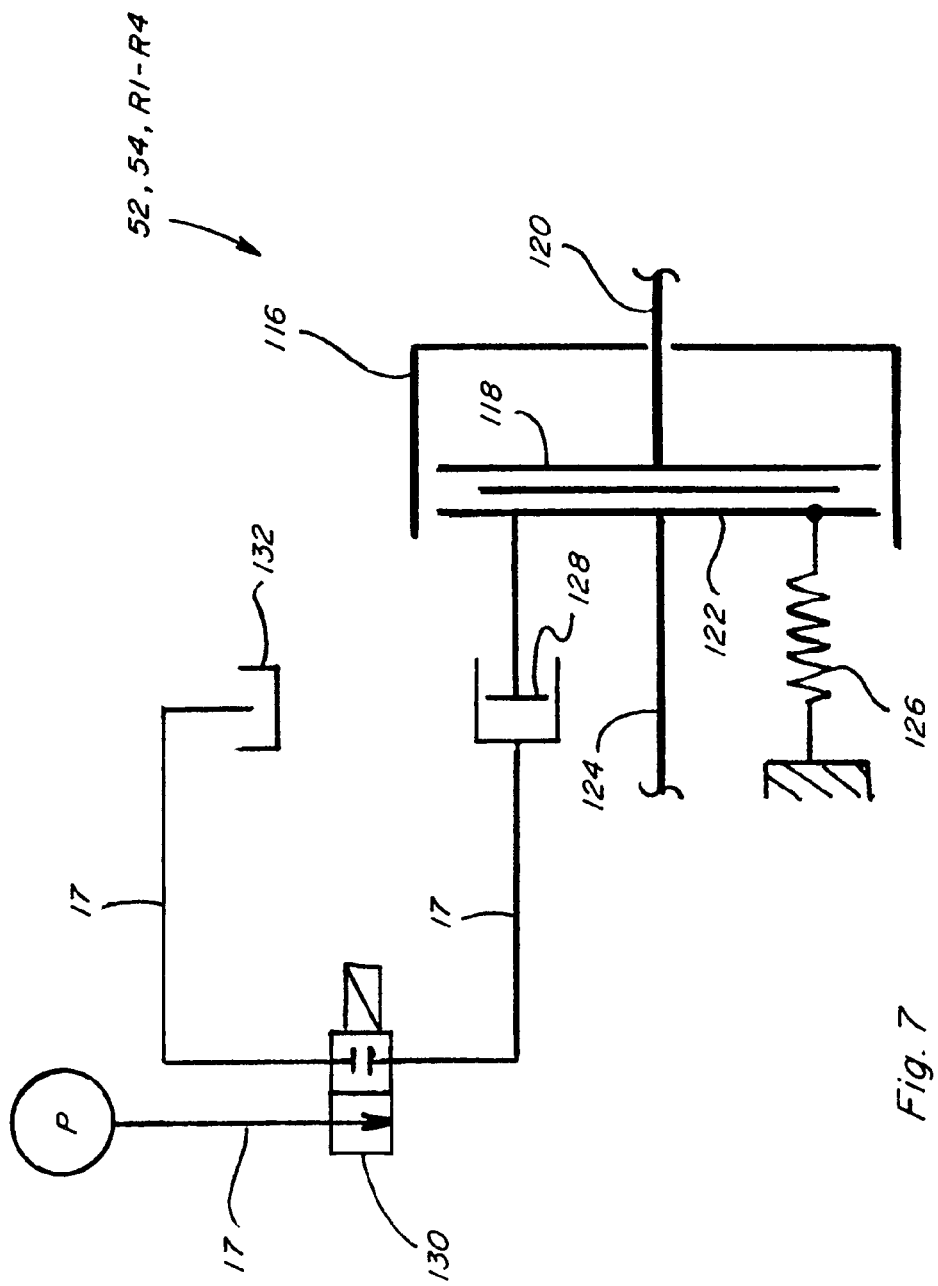
FIG. 7 is a simplified schematic view of a clutch for use with the method of the invention.

As noted above, a representative vehicle with which the invention can be used is illustrated in FIG. 6. A schematic of a hydraulically operated clutch representative of directional clutches 52 and 54, and range clutches R1-R4, is shown in FIG. 7. Hydrostatic power unit 12 or HSU with pressure transducers 110 used for clutch calibration is shown in FIG. 1. Alternatively, pressure differential can be determined using a differential pressure transducer between two ports containing the pressures to be monitored. A more detailed description of representative transmission and vehicle with which the present invention can be used, are described and disclosed in Dix. et al, U.S. patent application Ser. No. 12/652,490, filed Jan. 5, 2010, the disclosure of which is hereby incorporated herein by reference in its entirety.

Referring more particularly to FIG. 7, each of clutches 52, 54, and R1-R4 is contained in an enclosure or can 116, and includes plates 118 in connection with an output shaft 120 and plates 122 in connection with an input shaft 124. A clutch spring or springs 126 holds plates 118 and 122 apart, in a fluid operated clutch piston 128 is used to press them together for engaging the clutch. Pressurized fluid is supplied via fluid lines 17 by a proportional solenoid pressure reducing valve 130, which receives the pressurized fluid from a pump P of the vehicle, and is also in connection with a tank 132 of the vehicle. Pressure reducing valve 130 is controlled by a control signal received via conductive path 108 (FIG. 1) from controller 100, which control signal here is an electrical current having a value controlled by the controller.

According to the method of the invention, the vehicle is held stationary, preferably by application of parking brake 114. The clutch under calibration is filled in a manner similar to or the same as how the clutch is used during a shift. The pressure in the clutch is commanded using a control signal which is a current command having a value, translated to a pressure in pressure reducing valve 130, as explained above. The valve 130 is held at this test current (representative of the test pressure), and a determination made as to whether the clutch current (test pressure) is too high or too low.

This determination is made by checking the pressure in the hydraulic connection, e.g., lines 17 between the pump and the motor of power unit 12, using sensors 110, or a differential pressure transducer in connection with ports providing the required pressure information. The test is repeated in a test loop with one or more different test currents, either high or lower, depending on the result of the previous test pressure. In particular, if a previous test pressure failed to engage the clutch the next test pressure used will be incrementally higher. Conversely, if the previous test pressure more than just initially engaged the clutch, the next test pressure will be lower. Typically the algorithm starts with a default value, and it is a low pressure, so as to not aggressively engage the clutch by accident. As a representative definition, aggressively is defined generally as sufficient to cause movement of the vehicle were the parking brake not engaged.

Once a pressure or pressure condition in the power unit 12 indicative of initial engagement of the tested clutch is sensed, the clutch is commanded to empty, so the engine does not lug down too much. This is also done to reduce the chance of driving through the parking brake, resulting in vehicle movement. A separate check is done on the output speed, so the calibration is stopped if the vehicle moves. The value of the clutch current for achieving the pressure or pressure condition indicative of the initial engagement is recorded.

It should also be noted that a baseline pressure value for power unit 12 is recorded at the beginning of the calibration or before the clutch is filled, since the pressure in the power unit 12 will not be zero when the clutch is not engaged, due to drag, and there will be a charge pressure in the unit to keep it cool. As non-limiting examples, representative pressure or pressure conditions that can be used as indicative of initial engagement can be a change in a difference between pressure values outputted by the sensors 110, and a minimum or threshold change in the difference can be required such that signal noise is not a factor.

Conditions for Clutch Calibration

If calibration is entered and the vehicle is moving, parking brake state is not changed (if it is off when entering calibration mode, it will remain off, if it was on when calibration mode is entered, it will remain on). Vehicle moving message is displayed. Operator must move the FNRP selector to P (Park) before and re-entering calibration mode.

Clutch Calibration Search Technique

Each calibration "step" will consist of the quickfill pulse and additional fill time. The additional fill may be extended slightly to give time to detect whether the clutch engaged or not. Ramping is not performed.

After each setup, the clutch will be fully dumped, and the next step will not proceed until a set time has elapsed that is long enough to ensure the clutch is fully empty.

The calibration will use a search technique to find the clutch fill current that results in any level of clutch engagement. The preferred search technique uses a "divide and conquer" type approach (depending on the tuning, the step size is limited and may not always "divide" on the second trial). First, a guess is made at the fill current and the test is performed to see if the pressure is too high or too low after this fill. Next the fill current is adjusted by an increment, either up or down, depending on whether it was too high or too low. For the next guess, if the fill current indicated in the opposite direction, the increment is cut in half (otherwise it is not).

During each calibration step, the Clutch Current under test will be displayed to the operator.

In order to detect clutch engagement, the remainder of the driveline must be completely engaged. Since it is desired to perform the calibration in a controlled, repeatable way, vehicle movement is not desirable, so the parking brake is on during calibration, and the driveline will work against it. To complete the torque path in this transmission, two clutches need to be engaged. The table below indicates the second clutch to be engaged for the given clutch under test.

In addition to engaging a second clutch, the SPA needs to be adjusted so the clutch under test will have a set speed difference across it. If the SPA were adjusted for zero speed across it (as if engaging powered zero), either no or little torque would develop. Illustrative values for SPA for each clutch is shown in the table below, and picked to create a large speed difference across the clutch.

If the engine speed falls too low during the calibration step, the clutch is immediately dumped to prevent engine stall. The minimum fill pressure shall be reduced for the next step.

TABLE 1

Clutch Cal Pairings and SPA

| Clutch Being Calibrated | Clutch to Engage Before Clutch Calibration | Approximate Swashplate Angle Position during Calibration | Expected HSU Diff Pressure |
| --- | --- | --- | --- |
| R1 | Forward | +85 | Positive |
| R2 | Forward | −85 | Negative |
| R3 | Forward | +85 | Positive |
| R4 | Forward | −85 | Negative |
| Forward | R4 | −85 | Negative |
| Reverse | R4 | +85 | Negative |

Detecting Clutch Engagement

Clutch engagement is preferably detected by sensing rise of the difference between the values outputted by the pressure sensors 110 in the HSU. Generally, the pressure difference will start near zero when the clutches are not engaged, and rise in a linear fashion as the clutch torque increases. This is advantageous as it provides a very direct measure of only driveline torque, and does not vary with other factors such as other loads on the engine.

Rather than actually calculate the clutch pressure or driveline torque, the clutch calibration looks at the HSU pressure signals directly, since at the ideal kiss point, both the driveline torque and clutch torque should be zero. It is expected that there will be noise on the outputted signals of pressure sensors 110 and/or other issues with pressure fluctuations. The calibration looks for a change in the difference between the outputted pressure values of sensors 110, rather than a set level of the difference.

As noted above, the HSU pressure difference will not be zero when the driveline is completely disengaged, so the baseline pressure must be recorded prior to the quickfill pulse.

Use of hydrostatic power unit pressure for clutch calibration is advantageous as it does not depend on other factors, and it is a more direct measure of torque. As noted above, engine speed can vary as other loads on the engine change, such as hydraulic or PTO loads, various drags on the engine that may vary and such. Also, the engine governor is quite complex, and may change engine speeds due to complex algorithms to manage emissions, efficiency and other factors. How much the engine dips cannot always be a direct indication of the level of torque, which can result in different calibration values.

In light of all the foregoing, it should thus be apparent to those skilled in the art that there has been shown and described a novel METHOD OF CALIBRATING A HYDRAULICALLY OPERATED CLUTCH OF A CONTINUOUSLY VARIABLE TRANSMISSION USING PRESSURE BETWEEN A HYDROSTATIC PUMP AND MOTOR. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method of calibrating a hydraulically operated clutch in a continuously variable transmission, characterized by steps of:
   filling the clutch in a like manner as for a shift, using a control signal having a predetermined test value for achieving a test pressure in the clutch;
   while the clutch is filled, determining a resulting change in a pressure difference in a hydrostatic power unit of the transmission, and:
   if the resulting change in the pressure difference in the hydrostatic power unit is more than a first predetermined value, then emptying the clutch and refilling the clutch, using a control signal having a different predetermined test value for achieving a test pressure in the clutch less than the previous test pressure; and
   if the resulting change in the pressure difference in the hydrostatic power unit is less than a second predetermined value, then emptying the clutch and refilling the clutch using a control signal having a different predetermined test value for achieving a test pressure in the clutch greater than the previous test pressure; and
   if the resulting change in the pressure difference in the hydrostatic power unit is between the first predetermined value and the second predetermined value, then recording the control signal value used to achieve the resulting change as a calibration value.

2. The method of claim 1, further characterized by,
   while the clutch is filled, determining whether an output speed of the transmission has changed, and if yes, then emptying the clutch and refilling the clutch using a control signal value to achieve a test pressure in the clutch less than the previous test pressure.

3. The method of claim 1, wherein the step of determining the resulting change in the pressure difference in the hydrostatic power unit of the transmission includes determining a change in a pressure difference in at least two fluid lines between a pump and motor of the hydrostatic power unit.

4. The method of claim 1, wherein the control signal value comprises an electrical current value.

5. A method of calibrating a hydraulically operated clutch in a continuously variable transmission of a vehicle, characterized by steps of:
   preventing movement of the vehicle;
   controlling the clutch in a like manner as for a shift, using a predetermined control signal value to a test pressure and determining a change in a pressure difference condition in a hydrostatic power unit of the transmission resulting from the control signal value; and:
   if the determined change is indicative of initial engagement of the clutch, then recording a value representative of the control signal value;
   if the determined change is indicative of engagement of the clutch sufficiently to cause movement of the vehicle or the determined change is greater than a predetermined value, then emptying the clutch and refilling the clutch using another control signal value, to a test pressure less than the previous test pressure; and
   if the determined change is indicative of lack of engagement of the clutch, then emptying the clutch and refilling the clutch using another control signal value, to a test pressure greater than the previous test pressure.

6. The method of claim 5, wherein the step of preventing movement of the vehicle comprises engaging a parking brake of the vehicle.

7. The method of claim 5, further characterized by,
   while the clutch is filled, determining whether an output speed of the transmission has changed, and if yes, then emptying the clutch and refilling the clutch using another control signal value, to a lower test pressure.

8. The method of claim 5, wherein the step of determining the change in the pressure difference condition in the hydrostatic power unit of the transmission resulting from the test pressure includes determining pressures in at least two fluid lines between a pump and a motor of the hydrostatic power unit.

9. The method of claim 8, wherein the step of determining pressures in at least two fluid lines comprises determining a change in a pressures difference between the two fluid lines.

10. The method of claim 9, wherein the step of determining the change in the pressures difference between the two fluid lines includes determining whether the change exceeds a predetermined threshold value.

11. The method of claim 10, wherein the threshold value is selected to factor out noise in the pressure value.

12. A method of calibrating a hydraulically operated clutch in a continuously variable transmission of a vehicle, characterized by steps of:

preventing movement of the vehicle;

filling the clutch in a like manner as for a shift, to a test pressure and determining a resulting change in pressure conditions in fluid lines between a fluid pump and a motor of a hydrostatic system of the transmission; and:

if the determined change is indicative of initial engagement of the clutch, then recording a value representative of the test pressure;

if the determined change is indicative of engagement of the clutch sufficiently to cause movement of the vehicle or is greater than a predetermined value, then emptying the clutch and refilling the clutch to a test pressure less than the previous test pressure; and if the determined change is indicative of lack of engagement of the clutch, then emptying the clutch and refilling the clutch to a test pressure greater than the previous test pressure.

13. The method of claim 12, wherein the step of preventing movement of the vehicle comprises engaging a parking brake of the vehicle.

14. The method of claim 12, further characterized by, while the clutch is filled, determining whether an output speed of the transmission has changed, and if yes, then emptying the clutch and refilling the clutch to a lower test pressure.

15. The method of claim 12, wherein the step of determining the resulting change in pressure conditions in fluid lines comprises determining a difference between pressures in two fluid lines between the pump and the motor.

16. The method of claim 15, wherein the step of determining the difference between pressures in two fluid lines between the pump and the motor includes determining whether a change exists in the difference.

17. The method of claim 16, wherein the step of determining whether the change exists in the difference comprises determining if the change exceeds a threshold value.

* * * * *